Jan. 5, 1937.  A. A. WEST  2,066,596
PROCESS OF MAKING POROUS SEPARATORS
Filed Aug. 9, 1934
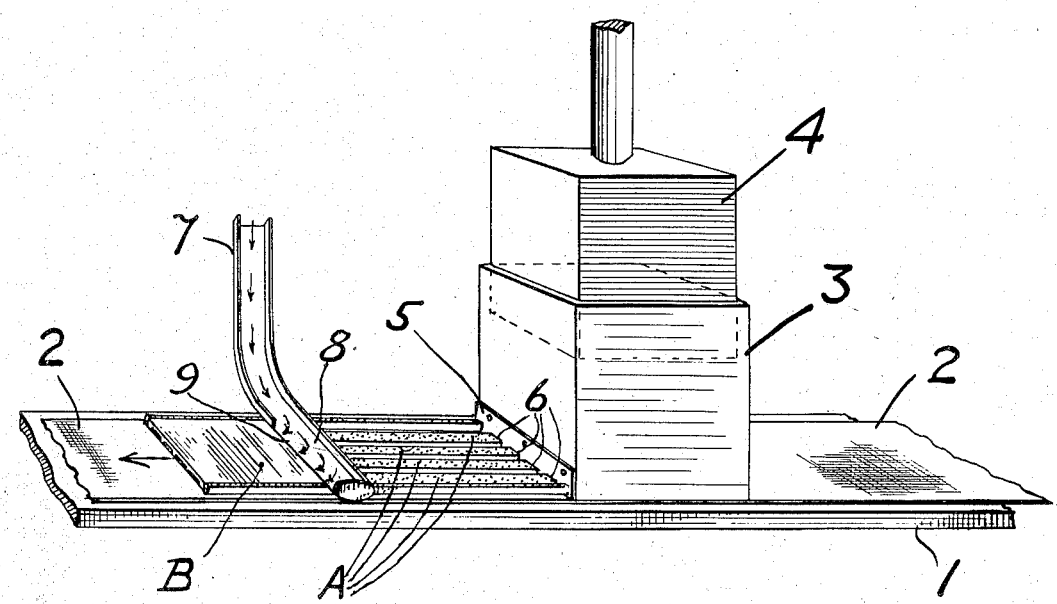
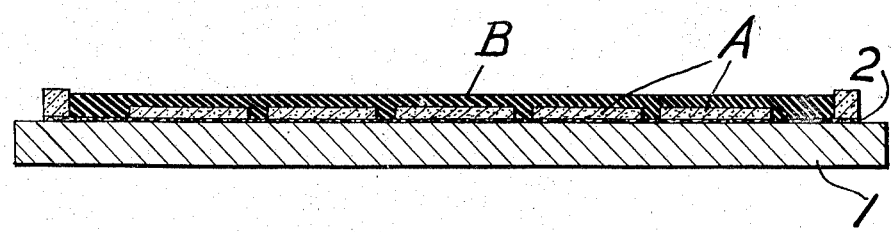
INVENTOR
Alan A. West
BY
Augustus B. Stoughton
ATTORNEY.

Patented Jan. 5, 1937

2,066,596

UNITED STATES PATENT OFFICE 2,066,596

PROCESS OF MAKING POROUS SEPARATORS

Alan A. West, West Oak Lane, Pa., assignor to The Electric Storage Battery Company, Philadelphia, Pa., a corporation of New Jersey Application August 9, 1934, Serial No. 739,187

7 Claims. (Cl. 18—50)

This invention has for its object the production of porous rubber separators of the grooved or ribbed type.

In the manufacture of this kind of separator a compound consisting of rubber latex with sulphur and other ingredients (as described in Patent No. 1,745,657 of Dr. Hermann Beckmann), and in a fluid or liquid state, is poured or flowed to an even depth or thickness in layer form onto a moving strip of cloth. The moving strip and superposed layer are then heated to cause the latex to form a gel, and, after this, the cloth and superposed gel are rolled on a suitable drum and are placed in a vulcanizer partly or entirely filled with water, and are there vulcanized in a wet state. The sheet produced in this way is a flat sheet, plain on both sides.

According to my invention, I apply ribbons of plastic material, of which damp clay is an example, to the moving cloth prior to the application of the latex or other rubber mixture thereto, and these ribbons form or provide grooves in the separator material. It is an advantage that the strip of cloth, with ribbons of plastic material applied to it, is flexible and can be conveniently rolled into a roll for subsequent vulcanization. By using ribbons of plastic material, as clay, it is very simple to change the dimensions and spacing of the grooves to make different designs of separators.

The invention will be claimed at the end hereof, and will be first described in connection with the apparatus shown in the drawing which is of a type suitable for the practice of the invention.

In the drawing:

Fig. 1 is a diagrammatic perspective view; and

Fig. 2 is a transverse sectional view, drawn to an enlarged scale.

In the drawing, 1 denotes a platform or table with a flat upper surface, and 2 represents the strip of cloth which travels over the surface of the table in the direction indicated by the arrow. 3 indicates a rectangular reservoir for containing wet clay or similar plastic, the lower edge of this reservoir fitting closely to the surface of the cloth strip 2. 5 represents a removable metal gate attached to the lower edge of the hopper from which the strip 2 is moving away and the lower edge of this metal gate 5 is provided with notches 6, through which the moistened clay is extruded in the form of ribbons lying on the cloth strip 2. The moistened clay is extruded through these notches by the pressure of the plunger 4 which by any suitable means (not shown) is moved down in the reservoir 3. The downward travel of the plunger is so adjusted that the strips of wet clay are extruded at a speed corresponding with the speed of the strip of cloth 2, thus forming on the latter a series of horizontal ribs spaced apart by suitable grooves.

To the left of the hopper 3 is a trough or chute 7 having a horizontal portion 8 lying across and in close proximity to the moving strip of cloth 2 with the ribs of extruded clay on its upper surface. A notch 9 is provided in the side of the trough 8 through which the liquid rubber mixture coming down the chute 7 overflows, covering the cloth sheet 2 and its superimposed ribs with a layer of the rubber mixture which is eventually set to a gel by heat and finally rolled into a roll and vulcanized. The means for applying the heat and the vulcanizing apparatus are not shown, as they form no part of this invention.

On the moving sheet 2, I mould or extrude a series of ribbons A of plastic material, such as, for instance, moist clay, the ribbons being of such dimensions and so spaced as to produce the reverse of the surface of the separator that is required; or, instead of the series of ribbons, I may mould or extrude onto the moving sheet a single wide ribbon of plastic having alternate ribs and grooves therein, and of the necessary contour to give the desired surface of the separators.

The mixture of latex, sulphur, and the like, B, is then allowed to flow out onto this continuous strip of plastic material, the top surface levelling off with the effect of gravity and the bottom surface assuming the contour of the matrix. The moving sheet, with the clay mould and rubber latex, is then passed over means which heat it and which causes the latex to assume the condition of a jelly, after which it is rolled up on a drum and vulcanized in the presence of water, as already mentioned.

After vulcanizing, the sheet is stripped from the drums, and the cloth, again, stripped from the rubber sheet. Some of the clay may adhere to the cloth, most of it remaining in the grooves of the rubber sheet, from which it is removed by a washing, or scrubbing, process. This leaves the grooved, rubber material ready to be trimmed into suitable sizes, as required for the separators.

It will be obvious to those skilled in the art that modifications may be made in details of procedure without departing from the spirit of the invention which is not limited to such matters or to matters of mere form or otherwise than the prior art and the appended claims may require.

I claim:—

1. A process of making grooved porous separators which consists in extruding upon a moving surface a continuous mould of plastic material, flowing onto the same a stream of fluid rubber mixture, heating the same to convert the mixture into a jelly, and finally vulcanizing in the presence of water.

2. A process of making porous separators which consists in extruding upon the surface of a moving strip of cloth a continuous clay mould, flowing onto the same a stream of rubber latex mixture, heating the same to convert the latex into a jelly, and vulcanizing the same in the presence of water.

3. A process of making porous separators which consists in extruding upon the surface of a moving strip of cloth a continuous mould of plastic material, flowing onto the same a stream of rubber latex mixture, heating the same to convert the latex into a jelly, and rolling the cloth and rubber mixture and plastic material onto a drum for the purpose of vulcanization.

4. In the manufacture of porous rubber sheets by flowing upon a moving cloth a layer of rubber latex mixture which is then rolled and cured and separated from the cloth, the improved method of providing ribs and grooves on the surfaces of the rubber sheets which comprises applying ribbons of plastic material to the surface of the cloth prior to the application of the latex mixture thereto, and removing said ribbons from the surfaces of the rubber sheets after the latter have been cured.

5. The process of making a grooved battery separator which consists in applying strips of plastic material to a horizontally moving sheet to form a mould, pouring thereon a liquid mixture capable of subsequent setting and solidification into a porous, acid-resistant, non-conducting mass suitable for use as a storage battery separator, setting and solidifying the mixture, removing the same from the mould, and cutting to size.

6. A process of making a grooved battery separator, which process consists in, applying moist clay ribbons to a moving surface to form a mould, pouring into said mould a liquid mixture capable of subsequent setting and solidification into a porous, acid-resistant, non-conducting mass suitable for use as a storage battery separator, setting and solidifying the mixture, and removing the same from the mould.

7. The process of making a grooved battery separator, which process consists in, extruding ribbons of clay upon a moving surface at the speed at which said surface is moving to form a mould, pouring into said mould a liquid mixture capable of subsequent setting and solidification into a porous, acid-resistant, non-conducting mass suitable for use as a storage battery separator, setting and solidifying the mixture, and removing the same from the mould.

ALAN A. WEST.